United States Patent [19]

Jakacki

[11] 3,755,614
[45] Aug. 28, 1973

[54] SEALED UNDERGROUND WIRING TEST STATION
[75] Inventor: Wallace B. Jakacki, Chalfont, Pa.
[73] Assignee: Barlow Corp., Philadelphia, Pa.
[22] Filed: Jan. 21, 1972
[21] Appl. No.: 219,653

[52] U.S. Cl. ............... 174/59, 174/17 VA, 174/37, 174/52 S, 174/65 R, 220/44 R, 277/29, 339/61 R
[51] Int. Cl. ............................................ H05k 5/06
[58] Field of Search .................... 174/8, 11 R, 17 R, 174/17 VA, 17 CT, 18, 37, 50, 50.5, 52 R, 52 S, 59, 60, 65 R, 72 R, 77 R, 87, 91; 215/56; 220/40 S, 44 R, DIG. 25; 277/29; 339/60 R, 61 R, 94 R

[56] References Cited
UNITED STATES PATENTS

| | | | |
|---|---|---|---|
| 1,702,416 | 2/1929 | Rutter et al. | 174/52 S |
| 3,393,015 | 7/1968 | Kaufman | 277/29 X |
| 3,435,124 | 3/1969 | Channell | 174/17 R X |
| 3,557,299 | 1/1971 | Dienes | 174/17 R X |
| 3,633,147 | 1/1972 | Polidori | 174/72 R UX |

FOREIGN PATENTS OR APPLICATIONS

| | | | |
|---|---|---|---|
| 598,218 | 9/1925 | France | 174/59 |
| 727,748 | 11/1942 | Germany | 174/50 |

*Primary Examiner*—Laramie E. Askin
*Attorney*—Caesar, Rivise, Bernstein & Cohen

[57] ABSTRACT

A test station is provided for underground wiring which comprises a housing having a planar circular base and a cap. The lateral surface of the base has an annular flange which extends around the base. An annular resilient gasket is disposed on the flange. The cap has an annular lip which is aligned with the flange. Means are provided for securing the cap to the base with the gasket being interposed between the lip and the flange and in communication with the interior of the housing to seal the housing. A pressure increase within the housing causes the gasket to be urged outwardly of the housing. When a pressure approximately twice that of atmospheric pressure is present in the housing, the gasket is completely removed from between the lip of the cap and the flange of the base to enable the escape of gas from the housing. After the pressure differential between the inside and outside of the housing has decreased, the resiliency of the gasket enables the gasket to close off the opening between the cap and the base to provide a fluid seal.

The station also includes a plurality of terminals disposed within respective flared openings in the base of the housing. Each terminal includes a threaded member soldered to an electrically conductive wire. A tapered collar is provided about the collar. Each terminal also includes a threaded nut which, when tightened on the threaded member, causes the sleeve to be compressed within the associated flared opening in the base of the housing to seal same.

9 Claims, 5 Drawing Figures

PATENTED AUG 28 1973 3,755,614
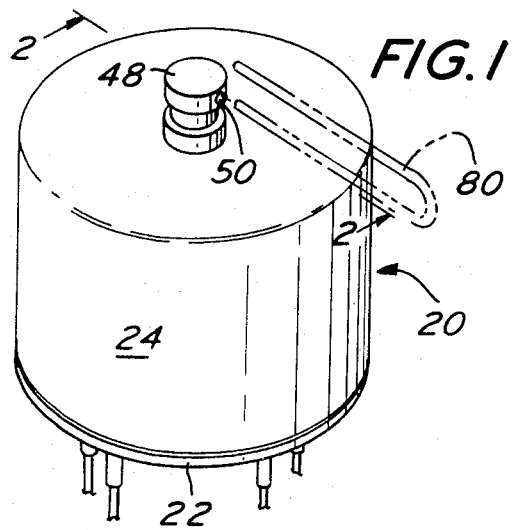
FIG.1
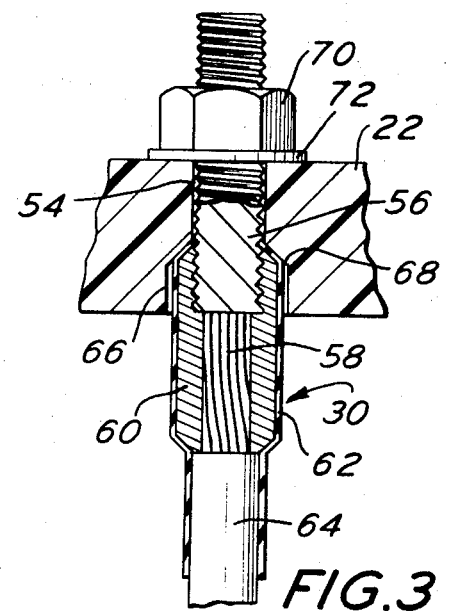
FIG.3
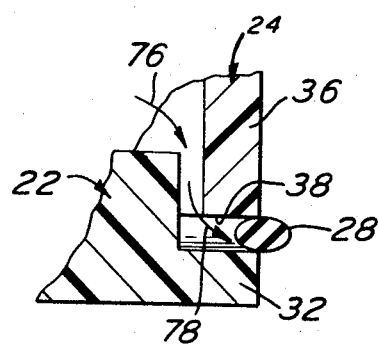
FIG.4
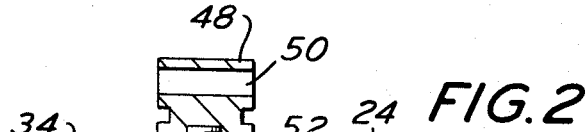
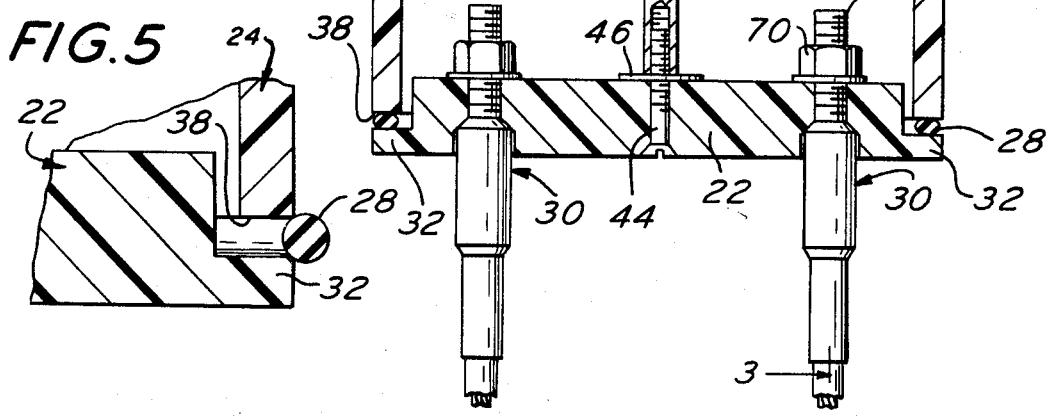
FIG.2
FIG.5

SEALED UNDERGROUND WIRING TEST STATION

This invention relates generally to test stations and more particularly to a test station for use in underground environments.

In the past, once underground wiring had been installed, the connections between the various underground wires could not be changed. Of course, electrical requirements do change long after underground wiring has been installed as, for example, after it has been installed under a road. In underground wiring, test stations are normally provided so that continuity checks can be made along the length of the wires. However, the test stations have been limited in that where the housings for the test stations are waterproof, changes cannot be made in the various interconnections between the underground wires. Also, grounding of lightning adjacent the test station can cause the pressure within the housing to increase so greatly that the housing is exploded.

It is, therefore, an object of the invention to overcome the aforementioned disadvantages.

Another object of the invention is to provide a new and improved test station which is easily assembled and enables the recognition of the wires connected to the station.

Another object of the invention is to provide a new and improved housing for a test station which enables undue pressure to be relieved yet the housing remains waterproof.

These and other objects of the invention are achieved by providing a test station for underground wiring which comprises a housing having a circular base and a cap. The lateral surface of the base has an annular flange which extends around the base. An annular resilient gasket disposed on the flange is provided. The cap has an annular lip which is aligned with the flange when the cap is placed on the base. Means are also provided for securing the cap to the base with the gasket being disposed between the lip and the flange to cause a tight seal. The gasket is so disposed that a pressure increase in the housing causes the gasket to be urged outwardly of the housing and enables the release of pressure in the housing.

Other objects and many of the attendant advantages of this invention will be readily appreciated as the same becomes better understood by reference to the following detailed description when considered in connection with the accompanying drawings wherein:

FIG. 1 is a perspective view of the test station embodying the invention;

FIG. 2 is an enlarged sectional view taken along the line 2—2 in FIG. 1;

FIG. 3 is an enlarged sectional view taken along the line 3—3 in FIG. 2;

FIG. 4 is an enlarged sectional view taken at the lower corner of the test station to show the effect of increased pressure within the housing; and FIG. 5 is a view similar to FIG. 4 with the resilient gasket in a position where it is maintaining a fluid seal for the housing after the gasket has been urged out of the housing to relieve pressure therein.

Referring now in greater detail to the various figures of the drawing wherein like reference numerals refer to like parts, a test station embodying the invention is shown generally at 20 in FIG. 1.

As best seen in FIG. 2, the test station basically comprises a base 22, a cap 24, fastening means 26 to secure the cap to the base, a resilient gasket 28 and four terminals 30 for wires connected to the test station 20.

Both the base and the cap are preferably comprised of polyvinyl chloride (PVC 1). The base 22 is circular and includes a flat upper and lower surface and an annular flange which extends around the entire lateral surface of the base. The annular flange 32 forms a shoulder at the lower portion of the base 22 upon which the cap 24 rests. The cap 24 is cylindrical and includes an upper wall 34 and a cylindrical side wall 36. The lowermost edge of the side wall 36 forms an annular lip 38 which is aligned with flange 32.

The top wall 34 of the cap 24 includes an opening 40, which, as will be seen hereinafter, is used for the fastening means to secure the cap to the base 22. As also seen in FIG. 2, opening 40 is flared at its upper end so that it can receive the uppermost portion of the fastening means 26.

The fastening means 26 comprises a rod 41 having a threaded upper portion 42 and a threaded bore at its lowermost end for reception of a threaded fastener 44. A washer 46 is provided around the stem of fastener 44 between the end of rod 40 and the top surface of base 22.

The fastening means 26 also includes a nut 48 which is generally cylindrical and includes a transversely extending opening 50 and a threaded longitudinally extending opening for the reception of the threaded portion 42 of rod 41. As also best seen in FIG. 2, the lowermost end of the nut 50 includes a tapered portion 52 which fits into the flared portion of opening 40 to provide an airtight seal when the nut 48 is screwed onto the threaded portion 42 of the rod 41.

The terminals 30 are best seen in FIG. 3. Each terminal 30 is provided in an opening 54 provided in the base 22. Four openings 54 are provided, each of which lies on the corner of a square, each corner of which is equally spaced from the center of the housing or the base 22. As also best seen in FIG. 3, the terminals 30 are formed by soldering together a threaded conductive metal portion 56 to the wire 58 within a conductive metal collar 60. The metal collar 60 has a tapered forward end portion. A sleeve 62 is provided over the collar 60 and embraces the outer periphery of the collar and covers a portion of the insulation 64 of wire 58. Sleeve 62 is preferably comprised of a heat shrinkable material, such as polyolefin, which is placed over the collar 60 and then has heat applied thereto so that it conforms to the outer shape of the collar 60.

Each of the openings 54 includes an enlarged portion 66 which is connected to the main portion 54 of the opening by a flared portion 68. The terminal also includes a nut 70 which is threadedly secured to the threaded portion 56 of the terminal 30. a washer 72 is provided about the threaded portion 66 between the nut and the top surface of the base 22. Each of the terminals 30 is of the same construction and, it should be noted that when nut 70 is tightened to the threaded portion 54, the upper tapered portion of collar 60 is drawn into the flared portion of opening 54 and thereby causes the slight compression of the sleeve 62 causing a watertight and airtight seal.

As seen in FIG. 2, the annular gasket 28 is disposed on the flange 32 between the lip 38 of cap 24 and the flange 32. When the nut 48 is tightened onto the rod 41, there is a drawing of the lip 38 towards the flange 32 causing the annular gasket 28 to be compressed therebetween and thereby causes a sealing of the inner contents of the housing of the test station 20. The annular gasket 28 is preferably comprised of neoprene. As best seen in FIG. 4, when there is an increase in pressure in the housing of the test station 20, there is a force exerted in the direction of arrows 76 and 78 causing an urging of the gasket 28 outwardly of the housing. When the pressure in the housing increases to approximately twice atmospheric pressure, a portion of the gasket 28 is moved out of the portion between lip 38 and flange 32 to provide a release path for the excess pressure in the housing. After the pressure has been reduced, the gasket 28, due to its resiliency, is drawn up against the edge of the lip 38 and the flange 32 as shown in FIG. 5 and still provide a fluid seal for the housing of the test station 20. The operation of the gasket is such that it prevents the destruction of the housing as a result of the grounding of lightning at or surrounding the housing or by other environmental effects which would cause the heating of the housing and thereby increasing the pressure of the contents of the housing.

It should be noted that the test stations are adapted to be tested on a periodic basis. Therefore, as soon as the nut 48 is removed so that the cap 24 can be removed from the base for checking the terminals 30, the resiliency of gasket 28 enables it to return to its original position on top of the flange 32. Thus, the restoration of the cap 24 to the base 22 causes the same seal that was originally provided. It should be noted that the size of cap 24 can be increased or decreased in length so that the size of the components housed in the housing of the test station can be changed. The only change that need be made to the structure is the increasing or decreasing of the length of rod 41 in order to accommodate the various sizes of caps.

It should also be noted that the terminals 30 may be removed and replaced due to the unique construction thereof. The polyolefin sleeve provides the necessary resiliency to enable the opening 54 to be sealed by the tightening of the nut 70 to the threaded portion 56 of the terminal 30.

The nut 48 is preferably tightened to the rod 41 in order to secure the cap 24 to base 22 by a U-shaped tool which is shown in phantom at 80 in FIG. 1. One of the legs of the U-shaped tool 80 is inserted through the opening 50 in nut 48 so that the required leverage can be provided to turn the nut 48 for securing the housing together and sealing the same.

Without further elaboration, the foregoing will so fully illustrate my invention that others may, by applying current or future knowledge, readily adapt the same for use under various conditions of service.

What is claimed as the invention is:

1. A test station for underground wiring comprising a housing have an interior, a planar circular base and a cap, the lateral surface of said base having an annular flange which extends around said base, an annular resilient gasket disposed on said flange, said cap having an annular lip which is aligned with said flange, and means securing said cap to said base with said gasket being disposed between said lip and said flange to tightly seal the interior of said housing, a portion of said gasket being in communication with the interior of said housing, whereupon a pressure increase in the interior of said housing causes the gasket to be urged outwardly of said housing.

2. The test station of claim 1 wherein the resiliency of said gasket enables said gasket to be removed from between said lip and said flange yet provide a fluid seal after the pressure differential between the inside and the outside of said housing has decreased.

3. The test station of claim 1 additionally comprising a plurality of removable terminals and wherein said base includes a plurality of openings for the reception of said terminals, each of said terminals being secured in said openings for sealing the openings when secured in place.

4. The test station of claim 1 wherein said means securing the cap to said base comprises a centrally disposed rod secured to the base of said housing, and a nut, said rod having a threaded portion which extends through the end of said cap, said nut being secured to said threaded portion to thereby secure said cap to said base.

5. The test station of claim 4 wherein said cap is cylindrical and includes an opening having a flared upper end portion and said nut secured to said threaded portion of said rod includes a tapered lowermost end which fits into said flared portion of said opening for sealing said housing.

6. A test station for underground wiring comprising a sealed housing, a plurality of terminals secured to said housing, said terminals each having a threaded conductive portion which is permanently secured to the end of a wire within a conductive collar, said conductive collar having a tapered forward edge and a thermoplastic sleeve provided over said collar and the insulated portion of said wire, said housing having an opening for each of said terminals, each of said openings including a flared shoulder, said tapered portion of said collar being drawn against said flared shoulder of said opening to provide a fluid-tight seal in said housing.

7. The test station of claim 6 wherein said threaded portion is secured to a nut within said housing to tighten said tapered portion to said flared shoulder, said nut being removable so that said terminals can be replaced by similar terminals.

8. The test station of claim 6 wherein said housing includes a planar circular base and a cap, the cylindrical surface of said base having an annular flange which extends around said base and an annular resilient gasket disposed on said flange, said cap having an annular lip which is aligned with said flange, and means securing said cap to said base with said gasket being disposed between said lip and said flange to tightly seal the interior of said housing, said gasket being in communication with the interior of said housing, whereupon a pressure increase in the interior of said housing causes said gasket to be urged outwardly of said housing.

9. The test station of claim 8 wherein said means securing the cap to said base comprises a centrally disposed rod secured to the base of said housing, and a nut, said rod having a threaded portion which extends through the end of said cap, said nut being secured to said threaded portion to thereby secure said cap to said base.

* * * * *

UNITED STATES PATENT OFFICE
CERTIFICATE OF CORRECTION

Patent No. 3,755,614　　　　　　　　　　Dated August 28, 1973

Wallace B. Jakacki

It is certified that errors appear in the above-identified patent and that said Letters Patent are hereby corrected as shown below:

>Abstract - Lines 24 and 25,
"A tapered collar is provided about the collar" should be --A tapered collar is provided about the soldered connection and a thermoplastic sleeve is provided about the collar--.

Signed and sealed this 12th day of February 1974.

(SEAL)
Attest:

EDWARD M. FLETCHER, JR.　　　　C. MARSHALL DANN
Attesting Officer　　　　　　　　Commissioner of Patents